(12) United States Patent
Fling et al.

(10) Patent No.: US 7,418,861 B2
(45) Date of Patent: Sep. 2, 2008

(54) MECHANICALLY SELF ACTUATED LIQUID LEVEL SENSOR

(76) Inventors: John J. Fling, 48501 E. Buckhorn Cove Rd., Little River, CA (US) 95458;
William F. Fling, 48501 E. Buckhorn Cove Rd., Little River, CA (US) 95458

( * ) Notice: Subject to any disclaimer, the term of this patent is extended or adjusted under 35 U.S.C. 154(b) by 417 days.

(21) Appl. No.: 11/328,839

(22) Filed: Jan. 10, 2006

(65) Prior Publication Data
US 2007/0157725 A1    Jul. 12, 2007

(51) Int. Cl.
*G01F 23/30*    (2006.01)

(52) U.S. Cl. .................. 73/315; 73/313; 73/290 R; 73/305; 73/322.5; 340/623; 340/624

(58) Field of Classification Search ............... 73/315; 340/623
See application file for complete search history.

(56) References Cited

U.S. PATENT DOCUMENTS

| | | | |
|---|---|---|---|
| 884,370 A | 4/1908 | Dobson | |
| 1,495,292 A | 5/1924 | Echtler | 73/863.85 |
| 1,627,056 A * | 5/1927 | Morris | 73/315 |
| 2,069,793 A * | 2/1937 | Watson | 73/315 |
| 2,102,615 A | 12/1937 | Cubete | 73/319 |
| 2,592,929 A * | 4/1952 | Matchett | 73/313 |
| 2,685,797 A | 8/1954 | Morschel | 73/319 |
| 2,771,774 A | 11/1956 | Fornasieri | 73/319 |
| 3,115,782 A | 12/1963 | Lenker | 73/863.85 |
| 3,314,292 A | 4/1967 | Schulte et al. | 73/290 |
| 3,555,904 A | 1/1971 | Lenker | 73/313 |
| 4,064,754 A * | 12/1977 | Frey | 73/313 |
| 4,092,861 A * | 6/1978 | Fling | 73/311 |
| 4,134,022 A | 1/1979 | Jacobsen | 250/577 |
| 4,154,103 A * | 5/1979 | Fling | 73/315 |
| 4,275,295 A | 6/1981 | Menningen et al. | 250/227 |
| 4,560,868 A | 12/1985 | Brogardh et al. | 250/227 |
| 4,692,023 A | 9/1987 | Ohtomo et al. | 356/5 |
| 4,745,293 A | 5/1988 | Christensen | 250/577 |
| 4,796,472 A | 1/1989 | Lew | 73/308 |
| 4,802,363 A * | 2/1989 | Fling et al. | 73/315 |
| 4,833,919 A * | 5/1989 | Saito et al. | 73/313 |
| 5,001,338 A | 3/1991 | Boero | 250/227.21 |
| 5,054,319 A * | 10/1991 | Fling | 73/319 |
| 5,068,527 A | 11/1991 | Iwamoto et al. | 250/227.21 |
| 5,396,568 A | 3/1995 | Reed et al. | 385/13 |
| 5,418,361 A | 5/1995 | Pinnock et al. | 250/227.21 |

(Continued)

*Primary Examiner*—Hezron E. Williams
*Assistant Examiner*—Samir M. Shah
(74) *Attorney, Agent, or Firm*—Lynn & Lynn

(57) ABSTRACT

A liquid level sensor for measuring liquid levels in underground and above ground containers includes a frame formed to have an elongate hollow tubular configuration that encloses a cavity. A cam pivot has an end extending into the cavity from a first inner wall portion of the frame. A cam is arranged to be pivotal about the end of the cam pivot. A float is placed in the cavity. A spring is arranged to bias the cam arm into contact with the float to force a side portion of the float into a locked position in frictional engagement with the second inner wall portion of the frame. A cam actuator pivotally mounted in a lower end portion of the frame exerts a force on the cam arm to release the float from the locked position when the lower end of the frame contacts the container bottom.

5 Claims, 2 Drawing Sheets

U.S. PATENT DOCUMENTS 5,446,280 A     8/1995  Wang et al. ............ 250/227.23
2005/0109104 A1*  5/2005  Fling et al. .................... 73/305
2007/0234798 A1*  10/2007  Fling et al. .................... 73/305

* cited by examiner

MECHANICALLY SELF ACTUATED LIQUID LEVEL SENSOR

BACKGROUND OF THE INVENTION

This invention relates generally to measuring liquid depth and particularly to measuring liquid level in containers located, both above and below ground.

U.S. Pat. No. 4,802,363, which issued Feb. 7, 1989 to one of the present inventors, discloses an apparatus for measuring liquid level, which although satisfactory for some uses, is inconvenient for some situations that arise in measuring liquid levels. The device disclosed in U.S. Pat. No. 4,802,363 has a rectangular float that is centered in a rectangular tube. Using this device requires rotation of a handle to unlock the float so that it can float to the liquid surface. The rectangular bar that actuates this locking action must be precisely centered along the full length of the rectangular tube in order to assure that a false lock will not occur. If this center rectangular bar becomes even slightly bent, twisted or concentrically displaced due to rough usage, it can cause the measuring float to be jammed in the tube and give an erroneous reading.

SUMMARY OF THE INVENTION

The present invention overcomes the problems described above in measuring liquid levels and eliminates the need for the person making the measurements to rotate the handle. The elimination of the handle rotation feature is extremely important in that current practice in the industry is to suspend the wooden dip sticks by a lanyard or a foldable handle into the tank opening allowing it to descend until the stick hits the bottom of the tank. The stick is then withdrawn, and the wet line on the stick is observed.

The operator of the liquid level sensor according to the present invention inserts the device into the tank until it reaches the bottom. As the device touches the bottom, a float is released to seek the liquid level. As the device is withdrawn from the tank, the float will be locked at the liquid level prior to withdrawal and will remain locked in position as the device is removed for reading of the measured level. The float will remain locked in this position until the device is reinserted for another measurement. Hence, the apparatus according to the present invention is characterized as being mechanically self actuated.

The apparatus for measuring liquid levels in a container such as an underground tank or the like includes an elongated frame having a lower end, an upper end and a passage extending lengthwise between the upper and lower ends. A float is arranged in the passage in the frame so that the float is movable to rise or fall so that it floats in the liquid at the level when the lock actuator located at the bottom of the frame contacts the bottom surface of the liquid container and releases the frictional forces locking the float against the frame wall. The apparatus according to the present invention further includes a means by which the lock actuator causes the float to be frictionally engaged with the frame as the lower end of the frame is moved away from the bottom surface of the container.

The apparatus preferably further includes means for connecting a float lock guide cam to an extended cam pivot such that the cam pivot is connected to an inner wall in the first side of the frame, and the cam pivot and float lock guide cam extends lengthwise in the frame. The lock actuator has a range of angular motion in the frame between the locked and unlocked position. In the locked position the tip of the lock actuator extends beyond the lower end of the frame. In the unlocked position the tip of the float actuator is displaced upward from the locked position toward the lower end of the frame. The float and float lock guide cam are arranged such that angular motion of the lock actuator as it moves from the unlocked position to the locked position causes the float lock guide cam to bring the float into frictional engagement with the frame to retain the float in a position in the frame to indicate the liquid level.

The apparatus preferably includes means for the float lock guide cam to pivot around an extended cam pivot. The extended cam pivot is connected to the inner wall in a first side of the frame and extends lengthwise for the frame's entire length. The float lock guide cam extends for the entire length of the extended cam pivot. This arrangement assures that float guide cam's position relative to the frame and the float cannot be distorted by rough usage of the device, resulting in a false liquid level indication. In addition the float lock guide cam interfaces with the extended cam pivot in a manner that will not permit it to disengage from the extended cam pivot.

The lock actuator preferably has a protrusion perpendicular, to its surface interior to the frame, located in a manner to engage the float lock guide-cam at its lower extremity. In the float locked position this protrusion is in a position such that the float lock guide cam assisted by spring forces causes the float into frictional engagement with the frame to retain the float in position in the frame to indicate liquid level. In the unlocked position of the float lock actuator this protrusion presses against the float lock guide cam to compress the spring load on the float lock guide-cam to relieve the spring pressure thus permitting the float to seek the liquid level.

The springs that provide the locking pressure for the float lock guide cam preferably are attached to and distributed periodically along the entire length of the float lock guide-cam. These K-shaped springs provide spring force between the inner wall in a first side of the frame and the cam arm of the float lock guide cam. Each spring applies separate pressure to provide uniform spring loading at all points along the float's travel. This assures consistent locking of the float at all liquid levels.

The apparatus is preferably configured with an unequal sided hexagonal shaped frame to permit the inclusion of several different liquid level scales in the device. However, the use of rectangular, triangular and circular configurations can be used with some reduction in the number of scales permitted.

A method according to the present invention for forming a device for measuring liquid levels in a container such as an underground or surface mounted tank or the like, comprises the steps of forming an elongated frame having a passage extending lengthwise between the upper and lower ends, placing a float in the passage in the frame so that the float is movable to rise to float in a liquid when the lower end of the frame contacts the bottom surface of the container, and placing a float lock guide cam in the passage to move the float laterally in the frame as the lower end of the frame is moved away from the bottom surface of the container to lock the float in frictional engagement with the frame.

An appreciation of the objectives of the present invention and more complete understanding of its structure and method of operation may be had by studying the following description of the preferred embodiment and by referring to the accompanying drawings.

DESCRIPTION OF THE PREFERRED EMBODIMENT

Figure 1:
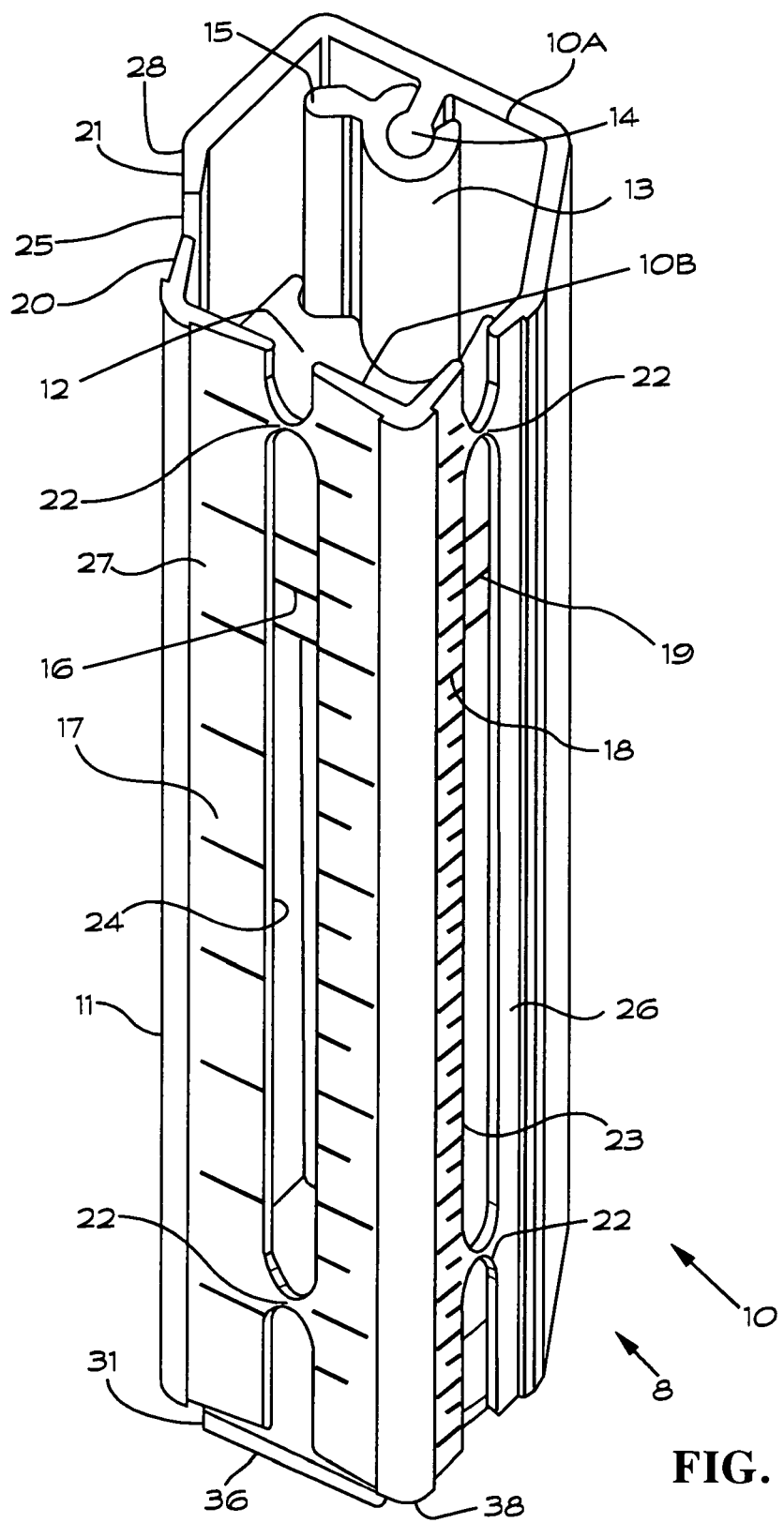
FIG. 1 Is a perspective view of a liquid level sensor according to the present invention showing the frame and float in the locked position.

As shown in FIG. 1, a liquid level sensor 8 according to the invention has a frame 10. The frame 10 may have an elongate generally tubular configuration with a generally hexagonal shaped cross section. The frame 10 typically has a length of five to seventeen feet to be suitable for measuring liquid levels in underground and surface mounted tanks (not shown). The shorter version has application to measuring liquid levels in barrels. The form of the cross section of the frame 10 is best seen in FIGS. 2A, 2B, 3A, and 3B. The frame 10 is not limited to the cross section shown in the drawings. The invention may be readily practiced using a frame having other cross sectional shapes such as circular, triangular or rectangular, for example, depending on applications and user preferences.

The frame 10 has an inner wall 10A on which an extended cam pivot 14 is attached. A float lock guide cam 13 is pivotally attached to the extended cam pivot 14 as shown. Both the extended cam pivot 14 and the float lock guide cam 13 extend over the length of frame 10 as is necessary to lock a float 12 in a desired measurement range. The float has liquid level indicating lines 16 and 19 thereon that align with indicating lines 18 on the frame 10.

The frame 10 also has walls 26, 27 and 28 as walls of the hexagon with these walls each containing elongated openings 23, 24, and 25, respectively. Bridges 22 are provided periodically across these openings 23, 24, and 25 to maintain the physical integrity of the frame 10 without obscuring any significant portion of the float 12 level indicating lines 16 and 19 and any others that may be present.

Figure 2A:
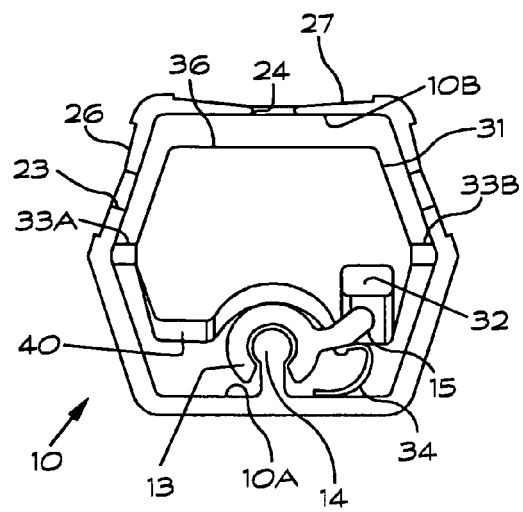
FIG. 2A is a perspective view showing the float lock actuator that may be included in the apparatus of FIG. 1 in the locked position.
Figure 3A:
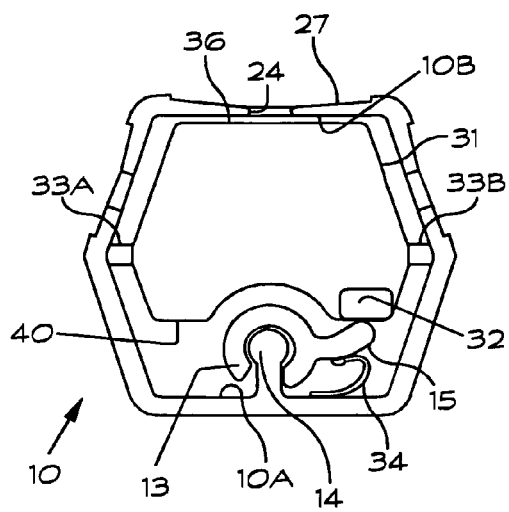
FIG. 3A is a perspective view showing the float lock actuator that may be included in the apparatus of FIG. 1 in the unlocked position.

FIGS. 2A and 3A show the operation of a float lock cam actuator 31 located at the bottom end of the frame 10. The float lock cam actuator 31 is formed generally as a flat plate having opposite sides 36 and 40. The float lock cam actuator 31 is pivotally mounted to the frame 10 by pivots 33A and 33B. Edge 36 of the float lock cam actuator 31 is arranged to touch the bottom surface of any tank or container (not shown) in which liquid level depth is being measured.

Figure 2B:
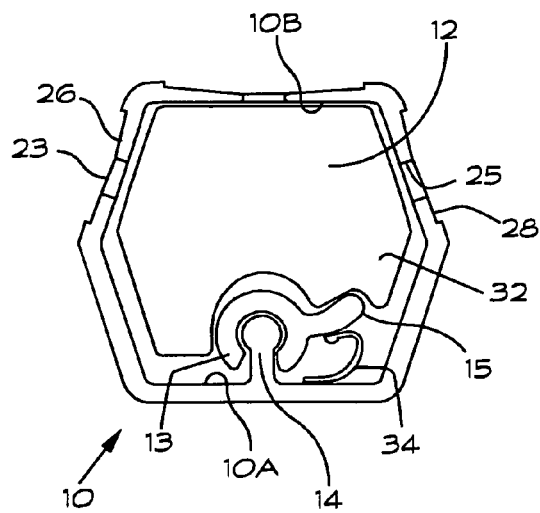
FIG. 2B is a perspective view showing the float, the float lock guide cam and the compression spring that may be included in the apparatus of FIG. 1 in the locked position.

FIG. 2A shows the float cam actuator 31 in its float locked position prior to the frame 10 being brought into contact with the bottom of the container being measured. The float cam actuator 31 is tilted around pivots 33A and 33B by the pressure of a spring 34 against the extended arm 15 of float lock guide cam 13 so that the edge 36 of the float cam actuator extends a small distance below the lower end 38 of the frame 10. The cam arm 15 presses against a projection 32 on the surface of the float cam actuator 31 to cause it to deflect. The result of this deflection of the float cam actuator 31 in response to the spring bias forces the float 12 to be in a locked condition as a result of frictional contact with the internal wall 10B of frame 10 as shown in FIG. 2B.

Figure 3B:
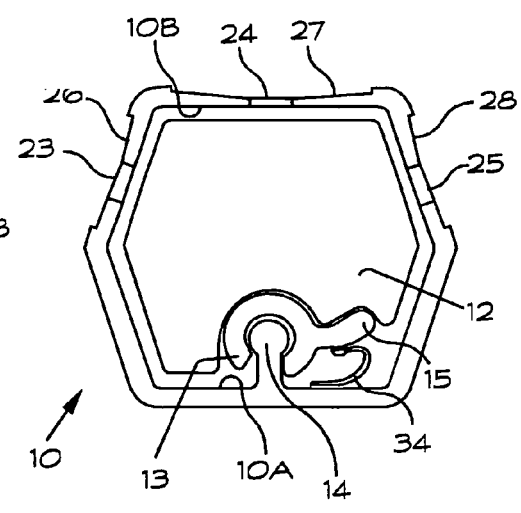
FIG. 3B is a perspective view showing the float, the float lock guide cam and the compression spring that may be included in the apparatus of FIG. 1 in the unlocked position.

Upon making full contact with the bottom of the tank or container, the float cam actuator 31 is forced to rotate around pivots 33A and 33B into the un-tilted position as shown in FIG. 3A. This deflects float lock guide cam 13 such that float 12 is spaced apart from the surface 10B and is no longer in frictional contact with the internal surface 10B, as shown in FIG. 3B, but is free to seek the liquid/air interface.

Upon release of the downward pressure on frame 10 by raising the frame 10 so that it is not in contact with the container bottom, allowing the float cam actuator 31 to tilt downward again, the float 12 will be locked in place at the level of the liquid interface.

The amount of movement by frame 10 required to permit transition from the float locked state to the unlocked state is quite small, and is calibrated by adjustment to the starting position of the scales on frame 10.

In addition it is important that the locking pressure on the float be uniform throughout its full travel distance, hence a plurality of springs 34 are distributed periodically along the float lock guide cam 13 as required to fulfill this requirement.

Although the present invention described in connection with a preferred embodiment it is to be understood that modifications within the scope of the appended claims may occur to those skilled in the appertaining art.

What is claimed is:

1. A liquid level sensor for measuring liquid levels in underground and above ground containers, comprising:

a frame formed to have an elongate hollow tubular configuration that encloses a cavity, the frame having a first inner wall portion, a second inner wall portion and a lower end;

a cam pivot having an end extending into the cavity from the first inner wall portion of the frame, the cam pivot being formed as an elongate projection extending substantially the entire length of the frame;

a cam placed in the cavity, the cam being formed as an elongate rod having a lengthwise recess therein, the cam being arranged such that a portion of the cam pivot extends into the lengthwise recess such that the cam is pivotal about the end of the cam pivot, the cam having a cam arm extending therefrom;

a float placed in the cavity;

a spring arranged between the first inner wall portion of the frame and the cam arm, the spring being arranged to exert a force transverse to the length of the frame to bias the cam arm into contact with the float to force a side portion of the float into a locked position where it is in frictional engagement with the second inner wall portion of the frame; and a cam actuator pivotally mounted in a lower end portion of the frame, the cam actuator being arranged such that a first edge portion thereof is inside the cavity and a second edge portion thereof extends beyond the lower end of the frame when the float is in the locked position, the cam actuator being further arranged such that contact between the second edge portion and the container bottom exerts a force on the second edge portion causing rotation of the second edge portion into the cavity urges the first edge portion against the cam arm, thereby rotating the cam arm away from the float to release the float from the locked position to an unlocked position so that the float is free to seek the liquid level in the container.

2. The liquid level sensor of claim 1 wherein removing the lower end of the frame from contact with the container bottom causes the spring to move the float into the locked position.

3. The liquid level sensor of claim 1 wherein the frame has a plurality of elongate lengthwise openings therein so that the position of the float may be seen.

4. The liquid level sensor of claim 1 wherein the cam actuator is formed as a plate having a projection extending therefrom adjacent the first edge portion and arranged so that the cam arm contacts the projection to transfer the spring force from the cam arm to the cam actuator.

5. The liquid level sensor of claim 1 wherein the cam and the cam pivot are arranged to be telescopically assembled together with the cam pivot fitting within the longwise recess to constrain the cam against lateral movement within the frame.

* * * * *